Oct. 13, 1959 G. A. LYON, JR 2,908,019
SINK CONSTRUCTION AND METHOD
Filed Feb. 26, 1957 2 Sheets-Sheet 1
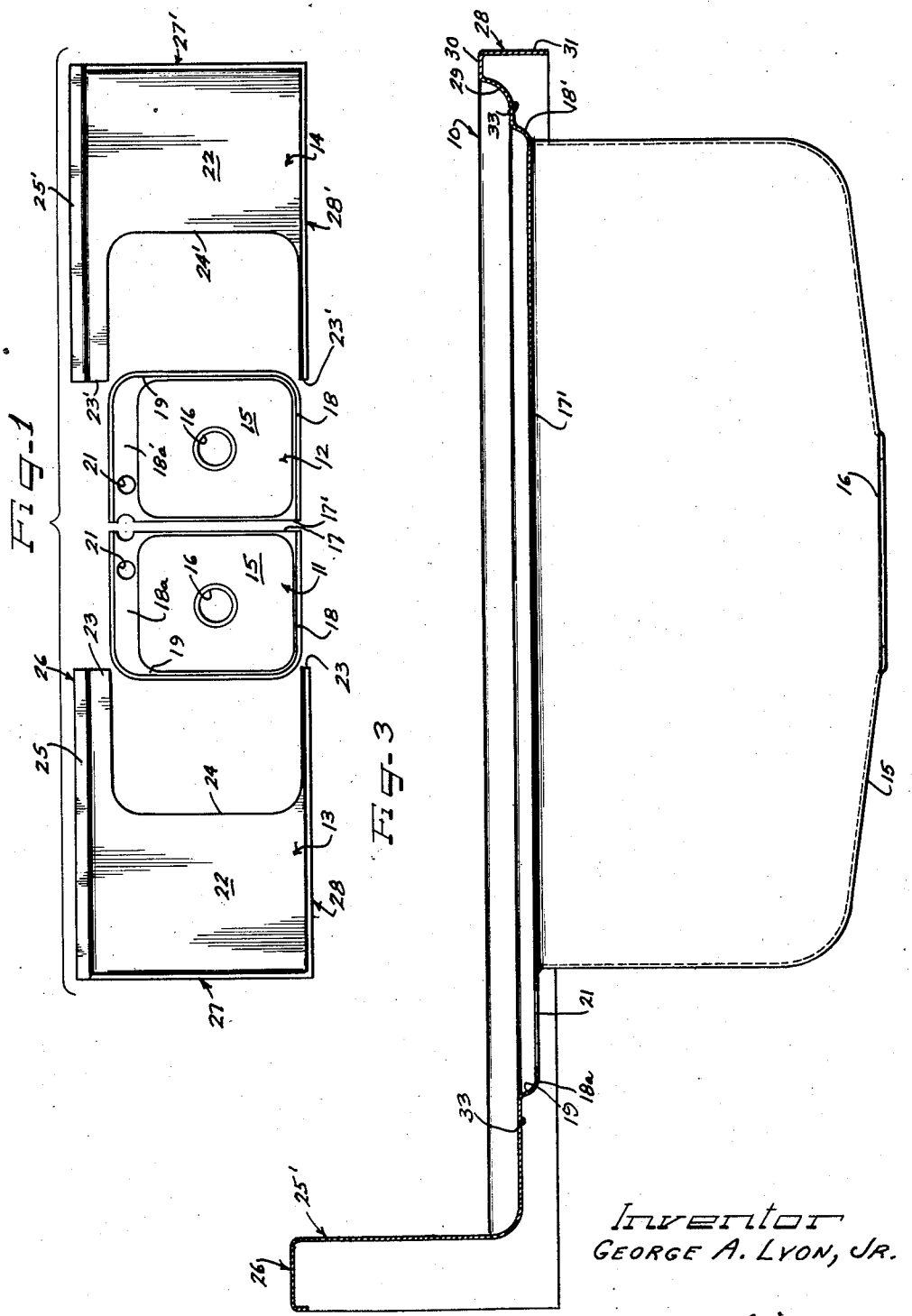
Inventor
GEORGE A. LYON, JR.
by Hill, Sherman, Meroni, Gross & Simpson Attys.

Oct. 13, 1959　　G. A. LYON, JR　　2,908,019
SINK CONSTRUCTION AND METHOD
Filed Feb. 26, 1957　　　　　　　　　　2 Sheets-Sheet 2
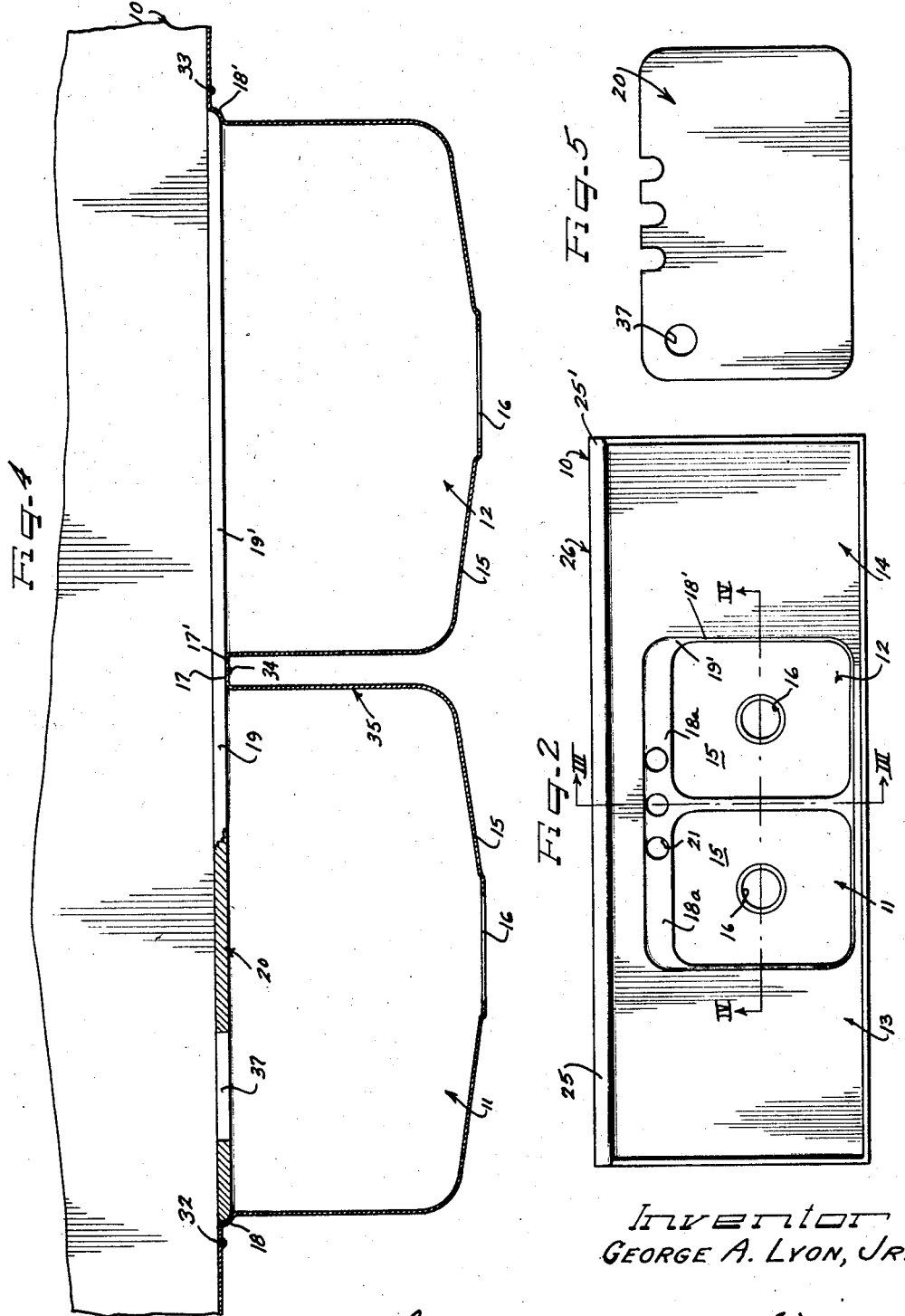
Inventor
GEORGE A. LYON, JR.

United States Patent Office 2,908,019
Patented Oct. 13, 1959

2,908,019

SINK CONSTRUCTION AND METHOD

George A. Lyon, Jr., Detroit, Mich.

Application February 26, 1957, Serial No. 642,458

6 Claims. (Cl. 4—187)

This invention relates generally to a sink structure and method of making same, and more particularly to a multipart sink bowl lodged within a notched out recess in a counter.

Still more specifically, this invention relates to an all metal sink and counter structure wherein the counter structure is comprised of left handed and right handed counter portions and the sink structure is comprised of left handed and right handed stamped out sink bowls. Opposed edges in the counter portions are notched out to form a sink bowl recess. Each of the sink bowls are welded in place within the notch of the associated counter portion to comprise left handed and right handed subassemblies, and the subassemblies are welded together along a common line to provide a unitary structure. The juncture between the sink bowl portions, and between the sink bowl portions and the counter portions, according to features of this invention, follows an irregular corrugated path such that the juncture weld is reinforced.

Accordingly, an object of this invention is to provide a new and improved sink structure.

Still another object of this invention is to provide a new and improved sink structure which lends itself to economical manufacture on a large production basis.

Yet another object of this invention is to provide a sink structure including bowl portions and notched out counter portions wherein the components may be readily assembled.

Still a further object of this invention is to provide a water tight seal at the junction of the bowl portions, at the junction of the counter portions, and at the juncture of the counter portions with the bowl portions.

Another and still further object of this invention is to provide separately stamped out all metal sink bowl portions having a reinforced water tight juncture between the same.

Yet still another object of this invention is to provide a new and improved method of making a double sink bowl and counter structure.

According to the general features of this invention there is provided in a multi-bowl sink structure, adjoining sheet metal dished bowls having juxtaposed edges turned toward each other and welded together in the form of a transverse hollow rib between the bowls. The bowls have outwardly turned marginal edges forming a substantially continuous groove around the periphery of the bowls in a plane generally above the hollow rib. A counter is provided notched to receive the bowls and welded to the groove edges. The grooves in the edges provide a corrugated reinforced area at the welds between the bowls and counter and also define a seat for receiving and supporting a cutting board above the top of the rib.

According to still other features of this invention there is provided in a method of making a sheet metal double sink bowl and counter structure, the steps of separately forming left handed and right handed sink bowls including turning outwardly and inner marginal edge on each of the bowls and outwardly turning and elevating marginal edges on three sides of the bowls above opposed inner marginal edges while grooving the outer marginal edges to provide a seat. The counter portion is then notched to provide a notched seat. The outer marginal edges with the notched edge and also the opposed inner marginal edges are all welded together forming a reinforced hollow rib with an irregular and reinforced weld at the junction of the groove seat with the inner marginal edges.

According to further features of the present invention, there is provided a method of manufacturing a double sink bowl and counter structure, which method includes the steps of notching out an intermediate area between opposed mating edges of counter portions providing opposed notch edges, forming two bowls each including one inner marginal edge, and joining the notch edges to the outer edges of the bowls as well as joining the inner marginal edges and the remaining opposed counter edges to each other, respectively.

Other objects, features, and advantages of this invention will more fully become apparent in view of the following detailed description taken in conjunction with the accompanying sheets of drawings illustrating therein one embodiment and in which:

Figure 1 is an exploded view of the components of my sink structure;

Figure 2 is a plan view of my sink structure;

Figure 3 is an enlarged cross sectional view taken substantially on the line III—III of Figure 2 looking in the direction indicated by the arrows;

Figure 4 is an enlarged cross sectional view taken substantially on the line IV—IV of Figure 2 looking in the direction indicated by the arrows; and Figure 5 is a side elevation of a cutting board which is adapted to be supported by the bowls.

As shown, on the drawings:

The reference numeral 10 indicates generally my sink structure. Prior to assembly of the components of the sink structure as shown in Fig. 2, the sink structure may include the components shown in Fig. 1. The sink structure preferably includes left handed and right handed bowl portions 11 and 12 and left handed and right handed counter portions 13 and 14. Each of the portions 11, 12, 13 and 14 preferably comprise stampings made from sheet metal such as stainless steel and the like thereby lending themselves to being produced on a large production basis.

The bowl portions 11 and 12 both are cup shaped and have an inclined bottom 15 which is inclined downwardly to sink bowl discharge opening 16 at the central area of the bottom 15. It will be appreciated the discharge opening 16 may be connected in a suitable manner to fluid discharge pipes located underneath the sink structure 10.

The detailed description of the sink structure 10 will hereinafter be more or less discussed in connection with the method of making same. It will be appreciated, that the left handed and right handed sink bowls 11 and 12 each include an outwardly turned inner marginal edge 17 and 17' which are adapted to oppose one another in confronting relation. The other three sides of the bowl portions have outer elevated and turned marginal sink edge areas or marginal flange portions or ledge portions 18 and 18' terminating in edges. The elevated ledges 18 and 19 are stepped and have grooves 19 and 19' which define a seat in which cutting board 20 (Fig. 5) may be lodged. The turned flanges 18 and 18' are elongated at the rear edge of the sink bowls 11 and 12 at 18a and 18a'. Provided on the elongated flanges are openings 21 through which is adapted to be received valve fittings and a discharge spout.

The stamped counter portions 13 and 14 are dished including main counter panels 22 and 22'. The panels 22 and 22' have opposed inner marginal edges 23 and 23' notched out along notch edges 24 and 24' to define a recess for receiving the sink bowls when in assembly.

Connected to the rear end of the panels 22 and 22' are splash plate portions 25 and 25' each of which are elevated vertically above the main panels 22 and 22'. As is noted in Fig. 3, the plates 25 and 25' are rearwardly and downwardly turned and may function as a hanger bracket 26.

The other peripheral edges, namely edges 27—27' and 28—28' include an inner curved portion 29 which is connected at its upper end to a flat portion 30. The flat portion 30 is turned under at right angles into terminal portion 31. It will be appreciated that the stepped peripheral edges above defined may be utilized also as hanger brackets for mounting the counter.

After the left handed and right handed sink bowls and counter portions have been formed in the manner above set forth, the components of my sink structure are in readiness to be assembled together. One manner of assembling the components is to first weld at 32 and 33 the notched edges 24 to the left handed bowl edges 18 and the notch edges 24' to the right handed bowl edges 18'. After the completion of this operation it will be appreciated that the opposed inner marginal edges 17 and 17' of the bowl portions 11 and 12, when placed in abutting relation, lie in substantially the same vertical plane as the opposed edges 23 and 23' on the counter portions 22 and 22'. At this point, the edges 23 and 23' are welded together along with the edges 17 and 17' at 34 (Fig. 4) to complete the assembly of my sink structure 10. After the completion of the assembly, it will be noted that the edges 17 and 17' are joined to form a hollow rib 35 which includes the side walls of the bowl portions 11 and 12. This transverse hollow rib is provided with a corrugated reinforced area at the stepped opposite margins which defines the grooved seat for the cutting board 20. This reinforced construction is highly advantageous since when pressure is applied downwardly against the opposed longitudinal margins of the sink bowls and the counter portions, considerable stress is developed at the weld 34 between the left handed and right handed portions of my sink structure. By providing an irregular weld not only between the bowl portions but also between the counter portions, a reinforced sink structure is provided.

While it is preferable to make the counter in two pieces it would be appreciated the counter could be made as an integral unit. Also, if it is desired, the sink portions may be assembled together prior to their being assembled with respect to the counter. Still further, the counter and sink portions may be placed in a jig and assembled together in a single operation.

The cutting board 20 (Fig. 5) is adapted to be lodged in the seat defined by the stepped flange groove 19 and 19' and upon the rib 35. The cutting board 20 is notched at 36 so that it may be fitted with respect to the fixtures which extend through the openings 21. A discharge opening 37 is provided at one end of the cutting board through which cuttings may fall into the sink area.

It will be understood that modifications and variations may be effected without departing from the scope of the novel concepts of the present invention.

I claim as my invention:

1. In a multi-sink and counter structure, left and right handed counter portions having opposed U-shaped edges each defining a sink bowl recess and with flat opposed marginal edges on opposed sides of the recesses for abutting welded engagement together, left and right handed sheet metal bowl portions comprising stampings, the bowl portions having marginal sink edge areas fastened to said counter portions along said U-shaped edges and with the left handed bowl portion and counter portion and the right handed bowl portion and counter portion having a weld disposed on a common vertical plane extending through the structure between the sink and counter portions with the opposed flat marginal edges being disposed along the plane in welded assembly together.

2. In a multi-sink and counter structure, left and right handed counter portions having opposed U-shaped edges each defining a sink bowl recess and with flat opposed marginal edges on opposed sides of the recesses for abutting welded engagement together, left and right handed sheet metal bowl portions comprising stampings, the bowl portions having marginal sink edge areas fastened to said counter portions along said U-shaped edges and with the left handed bowl portion and counter portion and the right handed bowl portion and counter portion having a weld disposed on a common vertical plane extending through the structure between the sink and counter portions with the opposed flat marginal edges being disposed along the plane in welded assembly together, the counter portions being comprised of sheet metal each including a splash panel portion turned away from the counter portions along a rear edge area of the counter structure at substantially right angles to the vertical plane and rearwardly spaced from the sink bowl portions, the counter portions including their splash panel portions being welded together along said common vertical plane.

3. In a multi-sink and counter structure, left and right handed counter portions each including a splash panel portion turned away from the counter portions along a rear area of the counter structure, said counter portions having opposed edges notched out providing notch edges which define a sink recess, left and right handed sheet metal bowl portions comprising stampings, the bowl portions having marginal sink edge areas attached to said counter portions along said notch edges and with the left handed bowl portion and counter portion as well as its splash panel portion and the right handed bowl portion and counter portion as well as its splash panel portion being joined together on a common line in a vertical pane between the same.

4. In a sink structure, sink bowl sections having opposed peripheral laterally turned edges, counter sections each having dished areas nestingly engaged about three sides of one of the bowl sections and with said counter sections each supporting one of said bowls, said counter sections having edges opposed to one another on opposite front and rear sides of the bowl sections, and a weld joining said counter sections together and said bowl sections together along a common vertical plane extending from the front to the rear edge of the sink structure, each of said dished areas nestingly engaged with turned edges on the sink bowl sections about the three sides of the bowl sections and having a U-shaped butt weld thereby providing a water tight sink bowl and counter surface area which butt weld extends on opposite sides of the bowl sections and intersects said weld disposed along said vertical plane.

5. In a method of making a double sink bowl and counter structure, the steps of notching out an intermediate area between opposed mating edges of counter portions providing opposed notch edges, forming two bowls each including one inner marginal edge, and joining the notch edges to the other edges of the bowls as well as joining the inner marginal edges and the remaining opposed counter edges to each other, respectively.

6. In a method of making a double sink bowl and counter structure, the steps of notching out an intermediate area between opposed mating edges of counter portions providing opposed notch edges, forming two bowls each including one inner marginal edge, and welding the notch edges to the other edges of the bowls, and welding the inner marginal edges and the remaining opposed counter edges together along a common line between the bowls and the counter portions.

References Cited in the file of this patent

UNITED STATES PATENTS

| | | |
|---|---|---|
| 2,029,802 | Webber | Feb. 5, 1936 |
| 2,062,809 | Erickson | Dec. 1, 1936 |
| 2,273,606 | Webber | Feb. 17, 1942 |
| 2,305,866 | Graf | Dec. 22, 1942 |
| 2,456,065 | Just | Dec. 14, 1948 |
| 2,520,486 | Zeigler et al. | Aug. 29, 1950 |